US012215011B2

(12) United States Patent
Schüler et al.

(10) Patent No.: US 12,215,011 B2
(45) Date of Patent: Feb. 4, 2025

(54) AUTONOMOUSLY GUIDED INDUSTRIAL TRUCK HAVING A PAIR OF SCANNER UNITS

(71) Applicant: Jungheinrich Aktiengesellschaft, Hamburg (DE)

(72) Inventors: Michael Schüler, Wakendorf (DE); Helmut Lohmann, Gyhum (DE); Holger Brunckhorst, Norderstedt (DE); Marcel Krenzin, Bad Bramstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 250 days.

(21) Appl. No.: 17/819,376

(22) Filed: Aug. 12, 2022

(65) Prior Publication Data

US 2023/0047525 A1 Feb. 16, 2023

(30) Foreign Application Priority Data

Aug. 16, 2021 (DE) ..................... 10 2021 121 222.7

(51) Int. Cl.
*B66F 9/075* (2006.01)
*B66F 9/06* (2006.01)

(52) U.S. Cl.
CPC ............ *B66F 9/0755* (2013.01); *B66F 9/063* (2013.01); *B66F 9/07586* (2013.01)

(58) Field of Classification Search
CPC ..... B66F 9/0755; B66F 9/063; B66F 9/07513
(Continued)

(56) References Cited

U.S. PATENT DOCUMENTS

2022/0390955 A1* 12/2022 McLachlan ........... B66F 9/0755

FOREIGN PATENT DOCUMENTS

CN 108946586 A 12/2018
DE 212014000129 U1 2/2016
(Continued)

OTHER PUBLICATIONS

German Application No. DE102021121222.7, "Search Report", Jul. 1, 2022, 4 pages.
(Continued)

*Primary Examiner* — Todd Melton
*Assistant Examiner* — Vincent Feng
(74) *Attorney, Agent, or Firm* — Kilpatrick Townsend & Stockton LLP

(57) ABSTRACT

An autonomously guided industrial truck comprising a vehicle body and a pair of support arms extending from the vehicle body. The vehicle body defines a longitudinal direction and a width direction of the industrial truck in sections in plan view of the industrial truck. Each of the support arms extending from the vehicle body has at least one load wheel. The industrial truck includes a pair of support wheels or drive wheels located underneath the vehicle body on a driving surface and opposite one another relative to the width direction. The industrial truck includes a pair of scanner units arranged vertically above the support wheels or drive wheels. The pair of scanning units defines a scanning plane with respective scanning regions each scanning unit of the pair of scanning units, and wherein the respective scanning units are symmetrically opposite one another within an outline of the vehicle body in the width direction of the industrial truck.

14 Claims, 2 Drawing Sheets

Figure 1:
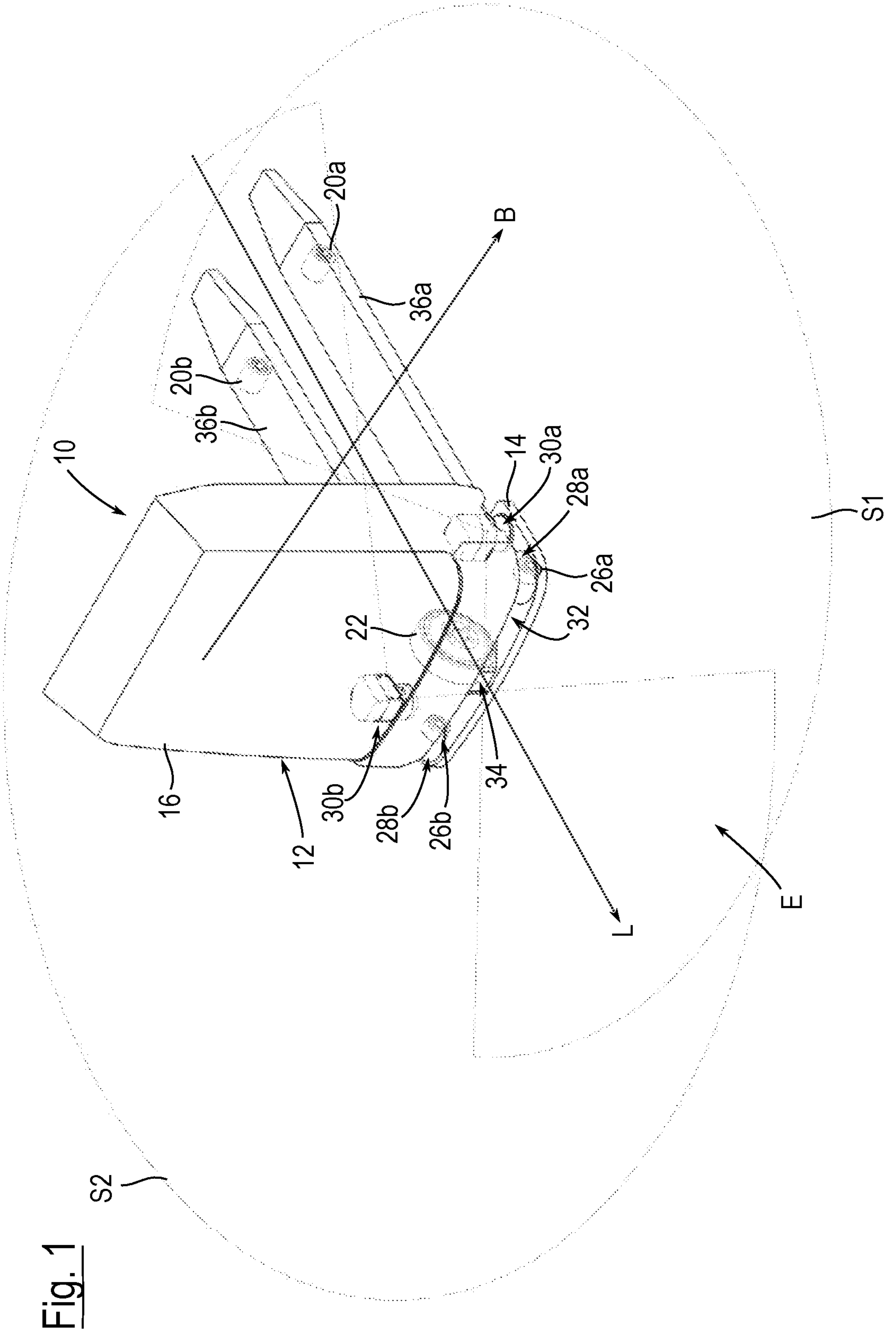

(58) Field of Classification Search
USPC ............................................................ 701/50
See application file for complete search history.

(56) References Cited

FOREIGN PATENT DOCUMENTS

| | | | | | |
|---|---|---|---|---|---|
| DE | 202020103181 | U1 | | 7/2020 | |
| DE | 102019213922 | A1 | | 3/2021 | |
| DE | 102020006337 | A1 | | 4/2021 | |
| EP | 3251918 | A1 | | 12/2017 | |
| GB | 2157436 | A | | 10/1985 | |
| WO | WO-2021069674 | A1 | * | 4/2021 | .............. B66F 9/063 |

OTHER PUBLICATIONS

European Application No. 22188534.6, Extended European Search Report mailed Jan. 24, 2023, 7 pages.

* cited by examiner

AUTONOMOUSLY GUIDED INDUSTRIAL TRUCK HAVING A PAIR OF SCANNER UNITS

CROSS REFERENCE TO RELATED APPLICATION

This application claims priority to German Patent Application No. 10 2021 121 222.7, filed in Germany on Aug. 16, 2021, the entire contents of which are hereby incorporated herein by reference.

The present invention relates to an autonomously guided industrial truck with a vehicle body, which defines a longitudinal direction and a width direction of the industrial truck along with an outline thereof in sections in a plan view of the industrial truck.

It is known in the technical field of industrial trucks (often also referred to as AGV—automated guided vehicles) to use scanner units to monitor the environment, both to prevent collisions with objects or persons and to record the surroundings in a navigation context. Accordingly, these scanner units both monitor predetermined security fields and record loads or load-receiving equipment, such as pallets.

In this case, a scanner assembly for three-wheeled vehicles is known from the prior art, for example DE 10 2019 213 942 A1, in which two scanner units are each positioned laterally next to a drive device. Complete coverage of the surroundings over 360° with overlaps between the scan regions of the individual scanner units can thereby be achieved.

Furthermore, in vehicles with a four-wheeled or five-wheeled chassis with support arms below the load-receiving means, it is known to arrange a scanner laterally in each case next to the drive axle in the front vehicle region. However, the respective scanning regions of this scanner pair are limited by the support arms in the load direction resulting in a blind spot or dead zone, particularly when driving into a pallet.

In practical use of the autonomously guided industrial trucks mentioned that are known from the prior art, problems appear, for example, for reasons to do with stability and load distribution, along with the driving characteristics and tilt resistance, an industrial truck having a three-wheeled chassis for receiving pallets at ground level can only be executed as a counterbalance truck. However, this leads to a relatively heavy and expensive overall structure of the corresponding vehicle.

In contrast to this, vehicles with support arms can have a lighter and more compact design, in so doing, however, as already mentioned above, the support arms with a suitable load carriage in the direction of the load restrict the view or the achievable scanning region of the scanner units used respectively.

With four-wheeled vehicles as well, only a very narrow possible track width of the drive axle results, provided that it is required for the scanner units to be arranged within the vehicle contour and have to carry out monitoring of the surroundings of the industrial truck past both the drive device and the necessary wheels. Previously, therefore, in the case of four-wheeled or five-wheeled vehicles the scanner units were generally arranged outside the contour or the outline of corresponding vehicles in the region of their vehicle body, which, however, inevitably had to lead to an increase in the overall width of the vehicle. Such vehicles cannot, therefore, be used in the desired manner in scenarios in which a maximum width of such a vehicle may not be exceeded, for example in logistics facilities with block storage in which pallets are placed on the driving surface at a minimum distance and, consequently, a corresponding industrial truck must not exceed the outer dimensions of the corresponding pallets, in particular in the width direction. In the event that Euro pallets are used in such logistics facilities with block storage, a maximum permissible width of less than 800 mm results for usable industrial trucks, for example.

Furthermore, in such logistics facilities it should be noted that it may be desirable to set the vertical height of the scanning plane such that unladen pallets can already be recognized in order to be able to ensure the safety and navigational capability of the corresponding industrial truck during operation. It may therefore be desirable to set the scanning plane to a vertical height of approximately 100 mm, which facilitates such a recognition of unladen pallets, but on the other hand integrating the corresponding scanner units into the industrial truck becomes more difficult, since frequently disruptive components of the industrial truck are arranged at this vertical height and in particular support wheels or drive wheels generally lie in sections in this vertical region.

It is therefore the object of the present invention to provide an autonomously guided industrial truck, which eliminates the aforementioned problems of known industrial trucks from the prior art and, in particular, enables a reduction in the overall width of the vehicle and an optimal positioning of the scanner units for use in logistics facilities with block storage.

For this purpose, the autonomously guided industrial truck according to the invention comprises a vehicle body that defines a longitudinal direction and a width direction of the industrial truck along with an outline thereof in sections in a plan view of the industrial truck, a pair of support arms extending from the vehicle body, each having at least one load wheel, a pair of support wheels or drive wheels, which are located underneath the vehicle body on a driving surface and which are opposite one another relative to the width direction, and a pair of scanner units arranged vertically above the support wheels, which scanning units define a scanning plane with their respective scanning regions and are symmetrically opposite one another within the outline of the vehicle body in the width direction of the industrial truck.

In addition to embodiments having four wheels, in which the support or drive wheels according to the invention act as drive wheels, embodiments are also conceivable in which the support or drive wheels act as pure support wheels and furthermore the industrial truck comprises a steered drive wheel that is arranged centrally with respect to the width direction and which is located below the vehicle body on the driving surface.

In this way, on the one hand, a structure of an autonomously guided industrial truck having at least four wheels, which produces advantageous driving and standing characteristics, in particular with higher loads and fast cornering, and on the other hand allows the scanner units to be arranged within the contour of the vehicle body at a position at which the support or drive wheels do not form any disruptive obstacles for the scanner unit, so that optimal coverage of the surroundings of the industrial truck in the vertical region of the scanning plane can be achieved by the pair of scanner units.

It should be noted here that, in the context of the present invention, the arrangement of the scanner units above the support or drive wheels is based on the fact that the actual scanning plane lies above these support or drive wheels, while individual components or sections of the scanner units can also overlap the support or drive wheels in the vertical direction due to the design, for example when mounts or housing sections of the scanner units extend vertically below the spanned scanning plane, which, however, are irrelevant to the actual scanning function of the scanner units.

It should also be noted that the respective scanning regions of the individual scanner units are defined both by the specific design of the scanner units used in the industrial truck according to the invention and by possible shaded regions that can result from components of the industrial truck or attachments thereof lying within the scanning plane. In this case, it must always be noted that, due to the vertically relatively low arrangement of the scanner units in the industrial truck according to the invention, frame elements or the like must inevitably be present for connecting components, for example sections of the vehicle body, that lie below and above the scanning plane. Since said components cannot be placed arbitrarily close to a longitudinal central axis in the width direction due to the central arrangement of the steered drive wheel present in five-wheeled embodiments and the components associated therewith, such as a drive motor and the like, along with the rotational range that has to be provided for this steered drive wheel, it is also desirable to arrange the scanner units in the width direction as far outwards as possible, but still protected within the outline of the vehicle body, as a result of which a widening of the industrial truck due to the scanner units is also prevented.

Furthermore, with regard to an optimal coverage of the surroundings of the industrial truck by the pair of scanner units, it can be advantageous if they are arranged behind the support or drive wheels in relation to the longitudinal direction of the industrial truck. Alternatively, however, embodiments are also conceivable in which the scanner units are placed in front of or also directly above the support or drive wheels in the longitudinal direction of the industrial truck.

In addition, it can be advantageous, both with regard to the standing and driving safety of the industrial truck according to the invention and to the coverage of the surroundings thereof in by means of the respective scanning regions by the scanner units, if the scanner units do not extend beyond the support or drive wheels in the width direction of the industrial truck.

Due to the aforementioned inevitable shading of certain regions of the scanning plane in the region of the vehicle body by structural parts, such as for example connecting frame elements between a part of the vehicle body lying below the scanning plane and a part lying above, in particular scanner units, which each have a scanning angle of approximately 270°, can be used. Thus, it can be ensured that, as a result of the design, the scanner units are able to cover the largest possible area of the surroundings of the industrial truck, but, on the other hand, it is possible to dispense with an even larger scanning angle to reduce costs since, as a result of the shading regions that are inevitably present, such a capability of the scanner unit could not be exploited anyway or sufficient all-round monitoring can already be achieved by means of two scanners with a respective scanning region of 270°, as will be described in more detail further below.

Using various measures, the vehicle body could be formed in the vertical region of the scanning plane in such a way that the scanner units, together with the respective scanning regions, can scan or cover the entire surroundings of the industrial truck, for example by arranging the frame elements for connecting above and below the scanning planes as centrally as possible relative to the width direction of the industrial truck or also by forming them so that they taper in their foremost region in relation to the longitudinal direction. Thus, a narrow dead zone could then only result directly in front of the industrial truck in a central region, but the scanning plane would also be covered over the entire angle range from a certain distance from the vehicle body in this direction.

In order to be able to achieve the flat design of the support wheels, which is necessary for an arrangement of the scanner units that is vertically as low as possible, and thus of the scanning plane, in five-wheeled embodiments with a centrally arranged steered drive wheel, it can be advantageous if said scanner units are not mounted on a frame structure above the support wheels or by means of a coupling rocker on the side of the industrial truck as is typically provided in the prior art, but instead are designed as parts of support wheel assemblies with respective housings that can form part of the outline of the vehicle body in sections. In particular, when these support wheel assemblies are arranged in respective front corner regions on the underside of the vehicle body, for example integrated in corresponding recesses of a base plate on the underbody of the vehicle body, a design, which is particularly compact in relation to the vertical direction, can be achieved, while at the same time a maximum distance is achieved between the support wheels in the width direction, which in turn can lead to the best possible stability and outstanding driving characteristics of the industrial truck.

In order to also achieve coverage in a rear region of the industrial truck according to the invention over the largest area possible of the surroundings of the industrial truck by means of the scanner units in the scanning plane, the support arms of the industrial truck can likewise be arranged completely below the scanning plane. This makes it possible for the corresponding scanning regions to be able to extend over the support arms, and accordingly these support arms can be "scanned."

In the case of a load unit, which has a pair of fork arms and a load stop connecting the fork arms and which is arranged to be horizontally displaceable on the vehicle body, as a further measure for ensuring coverage of the entire rear region of the surroundings of the industrial truck with the two scanner units, it can be ensured that the fork arms are likewise arranged completely below the scanning plane in a fully lowered state of the load unit. In this way, these fork arms can also be scanned in their fully lowered state in the manner just described. Alternatively, however, the industrial truck can also be designed in such a way that, in running order, the load unit is always raised to such an extent that the fork arms and all further components thereof are located completely above the scanning plane, in order to ensure that individual regions of the scanning plane are not switched off. While this alternative may potentially be structurally simpler to implement, since the very flat construction of the fork arms, and optionally of the support arms, can be dispensed with, and only a corresponding programming of a control unit has to be undertaken, an industrial truck according to the invention that is equipped in this way potentially has somewhat reduced operational efficiency, since the load unit always has to be lowered separately first before being driven into a pallet or the like, since sustained travel with a fully lowered load unit is not possible for the reasons mentioned above. In addition, when an industrial truck is traveling in warehouses with mixed operation, in which manually steered vehicles are also used, permanently raised load forks can constitute an increased risk of injury to persons present there.

As a further measure for increasing the achievable scanning angle of the individual scanner units in the embodiment just described, the load stop in its vertical region, which is at the height of the scanning plane when the load unit is in a fully lowered state, can have cutouts at its edges in the width direction. These cutouts can expediently correspond to the intended vertical dimensions of the scanning plane and project into the body of the load unit in the width direction to such an extent that the desired angle coverage is achieved without excessively weakening the structure thereof or making the accessibility of the corresponding fork arms excessively difficult.

In particular, in this and also in all previously described embodiments, the scanner units can be arranged such that the scanning plane lies at a vertical height of approximately 100 mm above the driving surface and/or has a vertical width of +/−25 mm. In this case, the value of 100 mm is accordingly to be understood as a mean value of the height of the scanning plane in its vertical extension, and it is understood that the term scanning plane is not to be understood as a two-dimensional object in the strictly geometric sense, since this plane always has a vertical width when considered practically.

As already mentioned above, the industrial truck can be designed such that the extent of its outline relative to the width direction is less than 800 mm, which is intended to enable use in logistics facilities with block storage.

Further features and advantages of the present invention will become even more apparent from the following description of an embodiment, when this is considered together with the accompanying figures. They show in detail:

FIG. 1 an isometric oblique front view of an autonomously guided industrial truck according to the invention; and FIG. 2 a view of the vehicle from FIG. 1 in a view from below.

In FIG. 1, an autonomously guided industrial truck according to the invention is shown in the first instance in an isometric oblique view from the front and is generally designated by reference sign 10. The industrial truck 10 comprises a vehicle body 12, which comprises a base plate 14 and an upper section 16, which accommodates components necessary for operating the industrial truck, for example an energy store, a control unit and the like. In this case, a longitudinal direction L and a width direction B are defined by the vehicle body.

As can be seen in particular from the view from below in FIG. 2, the vehicle body 12 also defines, in sections, in plan view or naturally also the view from below from FIG. 2 of the industrial truck 10, an outline thereof, wherein, in the specific embodiment shown in the figures, the outline of the base plate 14 substantially corresponds to that of the upper part 16, which, however, could also be accomplished differently in other embodiments of the present invention by the base plate 14 or the upper part 16 protruding beyond the other one of these two components in each case.

Figure 2:
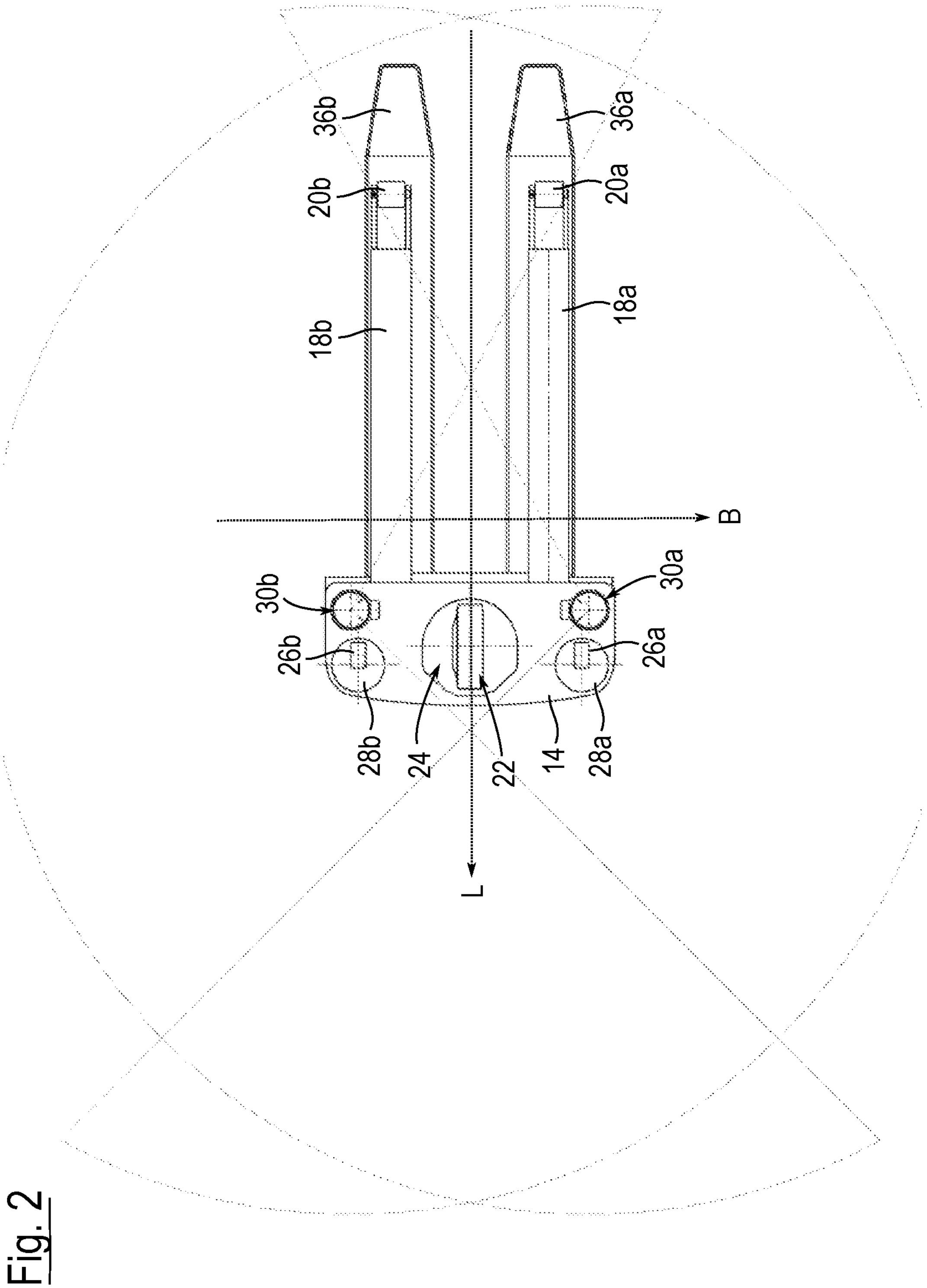

Furthermore, the industrial truck 10, as can be seen even better in FIG. 2, comprises a pair of support arms 18*a* and 18*b* extending from the vehicle body 12, each having a load wheel 20*a* or 20*b* attached thereto. Since the industrial truck 10 is embodied as a five-wheeled vehicle, a steered drive wheel 22 can also be seen in the figures, which steered drive wheel is arranged centrally in relation to the width direction B and which projects through a substantially circular recess 24 in the base plate 14 in a manner that is rotatably mounted about a vertical axis in order to be able to achieve the steering capability thereof. Furthermore, two support wheels 26*a* and 26*b* can be seen in the figures as parts of support wheel assemblies 28*a* and 28*b*, which are integrated in front corner regions of the vehicle body 12 and do not extend beyond the base plate 14 in the vertical direction, so that the base plate 14 and the support wheel assemblies 28*a* and 28*b* form a common vertical plane on their upper sides or the base plate 14 alternatively projects even beyond the support wheel assemblies 28*a* and 28*b*. The support wheels 26*a* and 26*b* are fully spaced apart from one another in the width direction B of the industrial truck 10 within the scope of the prescribed external dimensions of the industrial truck 10, in order to enable increased stability or maximum cornering speeds of the industrial truck 10, even in the laden state.

In the longitudinal direction L behind the support wheel assemblies 28*a* and 28*b*, two scanner units 30*a* and 30*b* are also located opposite one another in the width direction B within the outline of the vehicle body 12 in plan view, which scanner units 30*a* and 30*b* can be used both for personal safety and for navigation of the industrial truck 10 and are arranged in relation to the vertical direction, such that their scanning plane E lies in the height region between the base plate 14 with the support wheel assemblies 28*a* and 28*b* recessed therein on the one hand and the upper part 16 of the vehicle body 12 on the other hand. Although, due to their construction, the scanner units 30*a* and 30*b* also each extend vertically into the region of the base plate 14 or of the upper part 16 of the vehicle body 12, their scanning plane corresponds, in terms of its vertical position along with its vertical extension, to exactly one intermediate region 32 between these two components of the vehicle body 12, in which only a frame element 34 running forwards in the longitudinal direction L is provided to externally cover the steered drive wheel 22 and to connect the base plate 14 and the upper part 16.

As a result of this structural measure of arranging the support wheel assemblies 28*a*, 28*b* completely below the scanning plane E spanned by the scanner units 30*a* and 30*b*, along with the provision of only the frame element 34 in this vertical section of the vehicle body 12, it is possible, as can be clearly seen in FIG. 1, to realize the achievement of a substantially complete and partially overlapping covering of the entire angle range of the scanning plane E in the longitudinal direction L in front of the vehicle body 12 by means of the scanning regions S1 and S2 of the scanner units 30*a* and 30*b*.

In a similar manner, measures are likewise taken in the rear region of the industrial truck 10 in the longitudinal direction L so that the two scanning regions S1 and S2 can achieve the largest possible area coverage of the scanning plane S, in particular can cover the entire region next to and behind the industrial truck 10, in some cases even with an overlap between the two scanner units 30*a* and 30*b*.

In particular, both the support arms 18*a* and 18*b* and also the fork arms 36*a* and 36*b* of a load unit (not shown in more detail) that are shown in FIG. 1 arranged vertically above said support arms in a fully lowered state, are designed to be so flat with respect to the vertical direction in such a way that, in the state shown in FIG. 1, the scanning plane E is completely above these components and thus a scanning thereof is possible, which thus allows 360° coverage of the surroundings around the industrial truck 10 overall.

The invention claimed is:

1. An autonomously guided industrial truck, comprising:

a vehicle body that defines a longitudinal direction and a width direction of the industrial truck in sections in plan view of the industrial truck;

a pair of support arms extending from the vehicle body, each support arm of the pair of support arms having at least one load wheel;

a pair of wheels located underneath the vehicle body on a driving surface and opposite one another relative to the width direction; and a pair of scanner units arranged vertically above the wheels, wherein the pair of scanning units defines a scanning plane with respective scanning regions of each scanning unit of the pair of scanning units and, wherein the respective scanning units are symmetrically opposite one another within an outline of the vehicle body in the width direction of the industrial truck, wherein the vehicle body is formed in a vertical region of the scanning plane in such a way that the pair of scanner units jointly cover the entire surroundings of the industrial truck with the respective scanning regions.

2. The autonomously guided industrial truck of claim 1, wherein the pair of wheels comprises a pair of support wheels or drive wheels; and wherein the pair of scanner units is arranged behind the support wheels or the drive wheels with respect to the longitudinal direction of the industrial truck.

3. The autonomously guided industrial truck of claim 1, wherein the pair of scanner units does not extend beyond the wheels in the width direction of the industrial truck.

4. The autonomously guided industrial truck of claim 1, wherein each scanner unit of the pair of scanner units has a scanning angle of approximately two hundred seventy degrees) (270°).

5. The autonomously guided industrial truck of claim 1, wherein the pair of wheels comprises a pair of support wheels, and wherein the industrial truck further comprises a steered drive wheel arranged centrally with respect to the width direction and located on the driving base below the vehicle body.

6. The autonomously guided industrial truck of claim 5, wherein each support wheel of the pair of support wheels comprises a part of a respective support wheel assembly, each of the support wheel assemblies having a respective housing, wherein the respective housings, in sections, form part of the outline of the vehicle body.

7. The autonomously guided industrial truck of claim 6, wherein the support wheel assemblies are arranged in respective front corner regions on the underside of the vehicle body.

8. The autonomously guided industrial truck of claim 1, wherein the pair of support arms is arranged completely below the scanning plane.

9. The autonomously guided industrial truck of claim 1, further comprising a load unit arranged to be horizontally displaceable on the vehicle body with a pair of fork arms and a load stop connecting the fork arms, wherein the pair of fork arms is arranged completely below the scanning plane in a fully lowered state of the load unit.

10. The autonomously guided industrial truck of claim 9, wherein the load stop in its vertical region, which is at a height of the scanning plane when the load unit is in a fully lowered state, can have cutouts at its edges in the width direction.

11. The autonomously guided industrial truck of claim 1, wherein the pair of scanner units is arranged such that the scanning plane lies at a vertical height of approximately 100 mm above the driving surface.

12. The autonomously guided industrial truck of claim 1, wherein the outline of the vehicle body extends, relative to the width direction, less than 800 mm.

13. The autonomously guided industrial truck of claim 1, wherein the pair of wheels comprises a pair of drive wheels, and wherein the industrial truck further comprises a steered drive wheel arranged centrally with respect to the width direction and located on the driving base below the vehicle body.

14. The autonomously guided industrial truck of claim 1, wherein the pair of scanner units is arranged such that the scanning plane has a vertical width of +/−25 mm.

* * * * *